United States Patent [19]
Puerkner et al.

[11] Patent Number: 5,518,571
[45] Date of Patent: May 21, 1996

[54] USE OF POLYESTER RESINS AS HOT-MELT ADHESIVES

[75] Inventors: Eckhardt Puerkner, Hilden; Hermann Onusseit, Haan; Ulrich Eicken, Korschenbroich, all of Germany

[73] Assignee: Henkel Kommanditgesellschaft auf Aktien, Duesseldorf, Germany

[21] Appl. No.: 352,977

[22] Filed: Dec. 9, 1994

Related U.S. Application Data

[63] Continuation of Ser. No. 975,950, Feb. 24, 1993, abandoned.

[30] Foreign Application Priority Data

Aug. 24, 1990 [DE] Germany .................. 40 26 742.3

[51] Int. Cl.$^6$ ................................. C09J 1/00
[52] U.S. Cl. .................. 156/332; 156/155; 525/437; 528/295.5; 528/489
[58] Field of Search .................. 156/332, 155; 525/437; 528/489, 295.5

[56] References Cited

U.S. PATENT DOCUMENTS

| | | | |
|---|---|---|---|
| 3,053,782 | 9/1962 | Shelby | 156/332 |
| 3,480,575 | 11/1969 | Coats | 528/295.5 |
| 3,853,820 | 12/1974 | Vachon | 525/437 |
| 4,172,824 | 10/1979 | Harrington et al. | |
| 4,218,550 | 8/1980 | Pauze | 525/437 |
| 4,390,688 | 6/1983 | Walz et al. | 528/295.5 |

FOREIGN PATENT DOCUMENTS

| | | |
|---|---|---|
| 199468 | 10/1986 | European Pat. Off. |
| 297451 | 1/1989 | European Pat. Off. |
| 1495031 | 1/1969 | Germany. |
| 201153 | 9/1970 | Germany. |
| 1595278 | 12/1970 | Germany. |
| 2728161 | 12/1977 | Germany. |
| 2809840 | 9/1979 | Germany. |

*Primary Examiner*—John J. Gallagher
*Attorney, Agent, or Firm*—Wayne C. Jaeschke; Norvell E. Wisdom, Jr.; Daniel S. Ortiz

[57] ABSTRACT

The invention relates to the use of special alkyd resins and/or special polyester resins of monobasic carboxylic acids and/or esters thereof, polybasic carboxylic acids and/or anhydrides thereof, polyhydric alcohols and polyethylene glycol containing residual acid carboxyl groups at least partly reacted to form salts as pressure-sensitive hot-melt adhesives removable with aqueous solutions.

20 Claims, No Drawings

USE OF POLYESTER RESINS AS HOT-MELT ADHESIVES

This application is a continuation, of application Ser. No. 07/975,950 filed on Feb. 24, 1993, now abandoned.

FIELD OF THE INVENTION

The present invention is concerned with pressure-sensitive hot-melt adhesives and relates to the use of special polyester resins as pressure-sensitive hot-melt adhesives removable with aqueous solutions.

STATEMENT OF RELATED ART

Pressure-sensitive hot-melt adhesives are permanently tacky substances which, like hot-melt adhesives, are capable, when heated and in the liquid state, of effectively wetting surfaces of materials and of firmly adhering to the surfaces after cooling and hardening. Pressure-sensitive hot-melt adhesives are generally expected to suffer no heat damage for at least 24 hours at their processing temperature. For this reason, thermal stability and resistance to oxidation are particularly important properties in the choice of the raw materials. Other requirements which hot-melt adhesives have to satisfy include good wetting and adhesive power, high setting rates, hot tack, internal elasticity, and viscosity values which enable them to be applied by standard methods.

In view of the increasing significance of regeneration processes, there is also a need for pressure-sensitive hot-melt adhesives which are soluble in, or can be removed with, water.

DE-OS 27 28 161 describes warm hot-melt adhesives removable with water which are based on polyester resins of equimolar quantities of residues of dicarboxylic acid molecules and diol molecules. The essential constituent of these polyester resins are aromatic dicarboxylic acid molecules which contain a sulfonate group at the aromatic ring. In the absence of the sulfonate group, the polyester resin can no longer be removed with water. U.S. Pat. No. 4,172,824 describes water-removable copolyester hot-melts which are prepared from terephthalic acid, adipic acid, ethylene glycol and 1,4-butanediol and in which benzoic acid esters may be used for plasticization. Water-soluble hot-melts based on polyethyl oxazoline and hydroxy components or acid components are described in European patent applications EP 297 451 and 199 468.

Although the products known from the prior art may be effective for certain applications, there is still a need for pressure-sensitive hot-melt adhesives which can be removed with an aqueous solution and which satisfy other conditions required for specific uses. Thus, most of the water-removable hot-melt adhesives are too brittle for use in the plastics field. For example, on account of their lack of internal elasticity, brittle adhesives cannot be effectively used for labeling plastic bottles because they are unable to withstand the repeated distortion of the adhesive-covered plastics. Another problem of hot-melt adhesives is often their overly high solubility in water, so that unwanted separation can occur in the presence of water or high air humidity. Another problem of the water-removable hot-melt adhesives known from the prior art is their comparatively high viscosity which necessitates high processing temperatures. However, some materials to be coated with the adhesive, such as plastics for example, tend to shrink at high temperatures.

DESCRIPTION OF THE INVENTION

Accordingly, the problem addressed by the present invention was to provide products which could be used as pressure-sensitive hot-melt adhesives removable with aqueous solutions and which would overcome the disadvantages described above.

SUMMARY OF THE INVENTION

Accordingly, the present invention relates to the use of polyester resins of monobasic carboxylic acids and/or esters thereof, polybasic carboxylic acids and/or anhydrides thereof, polyhydric alcohols and polyethylene glycol containing residual carboxyl groups at least partly reacted to form salts as pressure-sensitive hot-melt adhesives removable with aqueous solutions.

The polyester resins can be alkyd resins. In accordance with general usage, alkyd resins are understood to be fatty acid and/or oil-modified polyester resins. Polyester resins containing incorporated polyethylene glycol are water-dispersible binders known per se for water-dilutable paints and lacquers. DE-AS 15 95 278 describes a process for the production of alkyd resins from drying oils, monobasic and dibasic acids and polyhydric alcohols which contain excess acid groups, of which 20 to 150% have been neutralized by addition of a base, and polyethylene glycol incorporated in quantities of up to 15% by weight in order to improve their dispersibility in water. In the form of aqueous dispersions, these alkyd resins may be used as oxidatively drying paint films. With addition of aminoplast resins, the aqueous dispersions of the alkyd resins are capable of curing at temperatures of 93° to 177° C.

DE-OS 14 95 031 describes a process for the production of stoving enamels based on alkyd resins of non-drying fatty acids. These alkyd resins are soluble and self-dispersible in water through incorporation of polyethylene glycol in quantities of 4 to 19% by weight and neutralization of the residual acid groups.

DE-OS 20 11 537 describes a process for the production of water-dilutable, acid-curing paints based on water-dispersible polyester resins. For dispersibility in water, these polyester resins contain polyethylene glycol and optionally esterified residual acid groups in quantities of up to 75% by weight.

In the prior art, however, polyester resins containing incorporated polyethylene glycol are used solely in the form of aqueous dispersions and, in addition, as paints which are of course intended to be water-resistant after hardening. There is no reference in the prior art to the use of polyester resins containing incorporated polyethylene glycol as pressure-sensitive hot-melt adhesives removable with aqueous solutions.

DESCRIPTION OF PREFERRED EMBODIMENTS

The polyester resins used in accordance with the invention are produced above all from monobasic carboxylic acids and/or esters thereof, polybasic carboxylic acids and/or anhydrides thereof and polyhydric alcohols and limited quantities of polyethylene glycol by transesterification and/or esterification and condensation reactions in a one-step or two-step process.

The polyester resins to be used according to the invention are preferably made by a process that includes an esterification reaction (which is to be understood herein as including a trans-esterification reaction) among the following components, with percentages expressed in terms of the total amount of materials of the types specified reacted, whether the esterification reaction is performed in a single step or in more than one step:

(A) at least 15 percent by weight (as the stoichiometric equivalent of free acids) of a component selected from monobasic carboxylic acids, esters thereof, and mixtures thereof;

(B) at least 15 percent by weight (as the stoichiometric equivalent of free acids) of a component selected from carboxylic acids that contain at least two carboxyl groups per molecule, anhydrides thereof, and mixtures thereof;

(C) at least 5 percent by weight of poly(ethylene glycols), i.e., materials conforming to the general chemical formula H—(O—CH$_2$CH$_2$)$_n$—OH, where n is a positive integer; and (D) at least 5 percent by weight of material selected from the group consisting of alcohols containing at least two hydroxyl groups but not conforming to the general formula in part (C) above, condensation products of such alcohols with alkylene oxides, and mixtures thereof.

These resins as initially prepared preferably have a free acid value of at least 2, but at least some of these residual free acid groups are neutralized before using the resin according to this invention.

The resins in accordance with the invention are preferably prepared by a two-step process. In the first step, the monobasic-carboxylic acids and/or their esters are reacted with part, preferably half, of the polyhydric alcohols at elevated temperatures, preferably at temperatures above 150° C., and with removal of the water of reaction. For acceleration, the reaction may be carried out in the presence of an esterification catalyst, for example a tin-based catalyst. In the second step, the carboxylic acids that contain at least two carboxylic acid groups per molecule and/or their anhydrides are reacted with the rest of the polyhydric alcohols and the polyethylene glycol.

The polyester resins used in accordance with the invention can be distinguished primarily in the type of monobasic carboxylic acids and/or esters used. Thus, the alkyd resins have been produced using natural fatty acids and/or esters thereof, preferably the triglyceride esters of the fatty acids. Natural fatty acids containing 6 to 22 and, more particularly, up to 18 carbon atoms and/or triglycerides thereof are preferably used. Suitable fatty acids or oils are, for example, caproic acid, caprylic acid, capric acid, lauric acid, palmitic acid, linoleic acid, linolenic acid, lauroleic acid, myristoleic acid, oleic acid, coconut oil, palm kernel oil, fish oil, sperm oil, rapeseed oil, peanut oil, beef tallow, olive oil and/or palm oil. It is of course possible to use different fatty acids, oils and/or mixtures of both saturated and unsaturated fatty acids and oils. However, mixtures having only a limited number of unsaturated components corresponding to an iodine value below 90 and preferably below 70 are preferred. Although higher unsaturated components are possible, they do promote the crosslinking reaction of the alkyd resins used, so that the pressure-sensitive hot-melt adhesive may be more difficult to remove with an aqueous solution after application. Fatty acids, oils and/or mixtures thereof which do not solidify at room temperature are also preferred. A measure of the solidification point in oleochemistry is the so-called titer. Fatty acids and/or oils of which the titer is below 10° C. and, more particularly, below 5° C. are preferred. If desired, other monocarboxylic acids, such as versatic acid, abietic acid and/or esters thereof, may be added to the natural fatty acids or their triglycerides. Versatic acids are tertiary, i.e. highly branched, saturated monocarboxylic acids having relatively long side chains and bearing tertiary COOH groups which can be prepared by Koch's synthesis from olefin, carbon monoxide and water. Suitable versatic acids are, for example, 2,2-dimethyl pentanoic, hexanoic, heptanoic and octanoic acids. The alkyd resins used are prepared using natural fatty acids and/or triglycerides thereof, optionally in admixture with versatic acids, abietic acid and/or esters thereof, in quantities of 15 to 50% by weight and preferably in quantities of 20 to 45% by weight, expressed as the quantity of acids used and based on the mixture of reactants.

The polyester resins used in accordance with the invention can also be prepared using saturated and/or unsaturated synthetic fatty acids and/or esters thereof. Synthetic fatty acids are generally produced by the paraffin oxidation method in which liquid paraffins are catalytically oxidized with air to fatty acids. Unsaturated synthetic fatty acids may be obtained, for example, by epoxidation of α-olefin and/or internal olefin with peracids and subsequent rearrangement of hydrogen cyanide and hydrolysis. Synthetic fatty acids containing 7 to 21 carbon atoms and/or esters thereof are preferably used for the production of the polyester resins used. The polyester resins used may be prepared using versatic acids, abietic acid and/or esters thereof in addition to the synthetic fatty acids and/or their esters. The quantities of synthetic fatty acids and/or esters used, the quantities of versatic acid, abietic acid and/or esters used and also the unsaturated component and titer of these synthetic mixtures for the polyester resins used lie in the range already mentioned for the alkyd resins used.

In addition, unsubstituted aromatic acids and ring-substituted derivatives thereof, such as benzoic acid and/or p-butyl benzoic acid, may be used as further monobasic carboxylic acids for the production of the polyester resins according to the invention. The quantities in which the aromatic carboxylic acids and/or ring-substituted derivatives thereof are used are in the range from 0 to 35% by weight and preferably in the range from 5 to 25% by weight, based on the mixture of reactants. At all events, polybasic carboxylic acids and/or anhydrides thereof, preferably dicarboxylic acids and, more particularly, aromatic dicarboxylic acids and/or anhydrides thereof, such as phthalic acid, isophthalic acid and/or anhydrides thereof, are used in quantities of 15 to 40% by weight and preferably in quantities of 20 to 35% by weight, expressed as acid anhydride and based on the mixture of reactants, for the production of the alkyd resins and polyester resins used in accordance with the invention.

Polyhydric alcohols, preferably trihydric and higher alcohols, and/or alkylene oxide adducts thereof are used for the production of the alkyd resins and/or polyester resins according to the invention. Suitable polyhydric alcohols are, for example, glycerol, pentaerythritol and/or trimethylol propane and ethylene oxide and/or propylene oxide adducts thereof. The polyhydric alcohols are reacted in quantities of 10 to 40% by weight and preferably in quantities of more than 20% by weight, based on the mixture of reactants, to form the resins used in accordance with the invention. In addition, polyethylene glycol is incorporated in the resins used in accordance with the invention irrespective of the polyhydric alcohol component. Polyethylene glycols having an average molecular weight of 600 to 10,000 and, more particularly, 2,000 to 6,000 are preferably incorporated in the alkyd resins and/or polyester resins used in quantities of 5 to 20% by weight and, more particularly, in quantities of less than 15% by weight.

The solubility in water of the resins used in accordance with the invention as pressure-sensitive hot-melt adhesives can be influenced through the polyethylene glycol content. If it is desired to obtain pressure-sensitive hot-melts which can be removed with small quantities of water, the polyethylene glycol content may even be increased beyond the stated range. A polyethylene glycol content below the stated range correspondingly impairs the removability of the resins used in accordance with the invention with aqueous solutions.

According to the invention, it is also possible to use modified polyester resins as pressure-sensitive hot-melt adhesives, more particularly urethane- and/or epoxy-modified resins. Urethane-modified resins are compounds known per se and may be obtained by partial replacement of the polybasic carboxylic acids, preferably the dicarboxylic acids and/or anhydrides thereof, with diisocyanates. The urethane-modified resins are preferably produced by a three-step process, of which the first two steps correspond in principle to those of the alkyd resins and/or polyester resins. The only difference is that the quantity of polybasic carboxylic acids used in the second step is reduced, preferably to 50% by weight, based on the quantity of anhydride in the mixture of reactants. In the third step of the process, the aliphatic and/or aromatic diisocyanates are reacted in quantities of up to 50% by weight and preferably in quantities of up to 30% by weight, based on the quantity of anhydride in the mixture of reactants, until the free isocyanate groups have reacted off, the reaction preferably being carried out at temperatures in the range from 50° to 170° C. When used in accordance with the invention, the urethane-modified alkyd resins and/or polyester resins are distinguished by improved adhesion to substrates, very good abrasion resistance and rapid curing. Pressure-sensitive hot-melt adhesives having improved mechanical properties are obtained where epoxy-modified alkyd and/or polyester resins are used in accordance with the invention. Epoxy-modified alkyd resins containing incorporated polyethylene glycol are described, for example, in DEOS 28 09 840. The alkyd resins described therein and the process for their production are expressly included within the disclosure of the present invention. DE-OS 28 09 840 does not contain any reference to the use according to the invention because it only mentions the use of the water-dispersed epoxy-modified alkyd resins as a coating compound. The epoxy-modified resins are preferably produced in the same way as the urethane-modified resins by a three-step process, in the last step of which the epoxy resins are added and are reacted at relatively high temperatures, preferably above 80° C. The epoxy resins are reacted with the preformed alkyd resins from steps one and two in quantities of up to 20% by weight, based on alkyd resin. Although larger additions of epoxy resins are possible, they increase the viscosity of the modified alkyd resins to a considerable extent. Suitable epoxy resins are described in DE-OS 28 09 840. Of these epoxy resins, those based on bisphenol A having an epoxide content of 1.5 to 2.5 moles of epoxide per kg of resin and an average molecular weight of 700 to 1,500 are particularly suitable.

The removability of the resins used with an aqueous solution may also be controlled through the residual acid carboxyl groups which are at least partly reacted to form salts. Alkyd resins and/or polyester resins which have a residual acid value of 2 to 100, preferably 50 and, more preferably, from 5 to 40 are preferred for the purposes of the invention. These residual acid carboxyl groups are at least partly reacted off by addition of a base with salt formation. The residual acid carboxyl groups of the resins used in accordance with the invention are preferably neutralized by addition of a base in degrees of neutralization above 10%, preferably above 50% and, more particularly, in the range from 75 to 100%. If desired, the residual acid carboxyl groups may of course even be neutralized in excess with bases. The bases used for neutralization are preferably hydroxides of the alkali metals and/or alkaline-earth metals and/or non-volatile amines, more particularly such non-volatile amines as triethanolamine, 2-amino-2-methyl propanol . 2 EO, 2-ethyl hexylamine, cyclohexylamine and/or N,N-dimethyl cyclohexylamine.

According to the invention, the polyester resins are used as pressure-sensitive hot-melt adhesives. In one embodiment of the present invention, the resins are used for attaching labels. Particularly good results are obtained when the resins are used for applying metal-, paper-, plastic- and/or thermoplastic-treated paper labels on various materials. The polyester resins are preferably used for applying paper and plastic labels to ceramic, metallic surfaces and glass and plastics, as for example in the labelling of beer bottles and plastic containers. Another application for the polyester resins is page gluing in bookbinding. In addition, the polyester resins may be used for pallet stabilization, i.e. for stabilizing articles on pallets. Finally, the resins may be used in paper converting, including for example gluing the paper of a kitchen roll to the inner cardboard tube.

The form in which the polyester resins are applied may be varied according to the application envisaged. Thus, the resins may be applied by nozzle or by the dip finger method for spot application or also by rollers or disks for whole-surface gluing. The polyester resins are mainly applied by nozzle when the adhesive is to be used as a pickup adhesive or as an overlapping adhesive for labeling. Where they are used for labeling, the alkyd resins and/or polyester resins are generally heated to temperatures above 80° C. and preferably to temperatures in the range from 90° to 140° C. and are applied to the materials to be glued by the methods mentioned. Polyester resins of comparatively low viscosity are particularly suitable for labeling. The resins used for labeling, which are applied by nozzle, preferably have a viscosity of 0.5 to 6 Pas at temperatures of 100° C. and a viscosity of 0.1 to 1.6 Pas at temperatures of 140° C., as measured with a Physika rotational viscosimeter, DIN Z3 spindle, in accordance with DIN 53 019. The relatively low-viscosity resins may be used with particular advantage for labeling plastic labels. Thus, these resins may readily be applied by nozzle at temperatures below 140° C. at which the plastic labels have not yet started to shrink. For other applications, for example for gluing paper labels or in paper converting, the alkyd resins and/or polyester resins may even have higher viscosities providing the pressure-sensitive hot-melt adhesives are applied by roller or disk. The resins applied by roller or disk preferably have viscosities of 0.1 to 7 Pas at 140° C., as measured with a Physika rotational viscosimeter. In general, however, the viscosities of the resins may also be varied within wide limits, depending on the particular application, by addition of solvents or plasticizers.

The polyester resins used may of course be used in admixture with standard additives, such as tackifier resins, wax-like substances, plasticizers, for example 2-ethyl hexanol phthalate, and/or stabilizers, for example antioxidants. Examples of tackifier resins are resinic acids and/or derivatives thereof, hydrocarbon resins and (poly)terpene resins. The quantities in which the possible additives are used are generally known to one skilled in the art. One particular advantage of the polyester resins used in accordance with the invention as pressure-sensitive hot-melt adhesives is that they can be removed with aqueous solutions. In principle, the aqueous solution may contain water-soluble solvents and/or detergents, such as surfactants, although it is preferred to use only water for removing the pressure-sensitive hot-melt adhesives. Thus, the polyester resins used as pressure-sensitive hot-melt adhesives can be partly dissolved with water at least to such an extent that the adhesive bond is broken. By treatment with hot water, preferably with water at 70° C., and optionally by further washing or with mechanical assistance, the adhesives can be completely removed again. For example, the adhesives which have been used for labeling glass bottles can be removed again during the recycling process or during the washing of the bottles. The polyester resins used as pressure-sensitive hot-melt adhesives for pallet stabilization may also be removed with water in the same way as in the reprocessing of paperboard, for example for repulping.

EXAMPLES

Production of Resins

Example 1

In a two-liter three-necked flask equipped with a nitrogen inlet, reflux condenser and water separator, 312 g of coconut oil fatty acid (acid value 266–276, saponification value 267–277, iodine value 6–10) were heated for about 3 hours to 200° C. with 67 g of trimethylol propane, 146 g of pentaerythritol and 155 g of benzoic acid in the presence of 100 ml of xylene and 2.0 g of a tin-based esterification catalyst (Swedcat 3, a product of Swedcat). During the reaction, 50 ml of water were separated as condensate. After cooling of the reaction mixture to 150° C., 146 g of pentaerythritol, 336 g of phthalic anhydride and 106 g of polyethylene glycol having an average molecular weight of 3,000 were added and the reaction mixture was reheated to 200° C. 35.5 ml water were separated as condensate. After an acid value of 14.5 had been reached, the reaction was terminated and the xylene was removed in vacuo. 54.5 g of 2-amino-2-methyl propanol.2 EO and 2.4 g of the antioxidant Irganox™ 1010, i.e. pentaerythritol tetrakis-(β-3(3,5-di-tertiarybutyl-4-hydroxyphenylpropionate), were added to 1172 g of the alkyd resin.

Example 2

314 g of coconut oil, 146 g of pentaerythritol, 155 g of benzoic acid were reacted as in Example 1 in the presence of 100 ml of xylene and 2 g of Swedcat 3. 24 ml of water were separated as condensate. 146 g of pentaerythritol, 336 g of phthalic anhydride and 106 g of polyethylene glycol having an average molecular weight of 3,000 were then added to the cooled reaction mixture and reacted as in Example 1. 39 ml of condensate were separated and the reaction was terminated at an acid value of 8.2, the xylene being removed in vacuo. 29.7 g of 2-amino-2-methyl propanol . 2 EO and 1.1 g of di-tertiarybutyl hydroxy-4-toluene (antioxidant) were added to 1130 g of the alkyd resin obtained.

Example 3

416 g of coconut oil fatty acid, 51.5 g of trimethylol propane, 146 g of pentaerythritol and 46 g of tertiary butyl benzoic acid were reacted as in Example 1 in the presence of 100 ml of xylene and 2 g of Swedcat 3. 43 ml of water and condensate were separated. 146 g of pentaerythritol, 336 g of phthalic anhydride, 106 g of polyethylene glycol having an average molecular weight of 3,000 were then reacted as in Example 1. After separation of 40.5 ml of water as condensate and after an acid value of 6.0 had been reached, the reaction was terminated and the xylene was removed in vacuo. The alkyd resin was neutralized with 19.2 g of 2-amino-2-methyl propanol .2 EO per kilo of resin.

Example 4

208 g of coconut oil fatty acid, 51.5 g of trimethylol propane, 146 g of pentaerythritol, 104 g of benzoic acid and 132 g of Pentalyn H™ (ester of pentaerythritol with 4 moles of abietic acid) were reacted as in Example 1 in the presence of 100 ml of xylene and 2 g of Swedcat 3. 39 ml of water were separated as condensate. 146 g of pentaerythritol, 336 g of phthalic anhydride and 106 g of polyethylene glycol having an average molecular weight of 3,000 were then reacted as in Example 1, 39 ml of water being separated as condensate. The reaction was terminated at an acid value of 17. After removal of the xylene in vacuo, the alkyd resin was neutralized with 54.5 g of 2-amino-2-methyl propanol. 2 EO per kilo of resin.

Example 5

314 g of coconut oil, 146 g of pentaerythritol, 224 g of p-tertiarybutyl benzoic acid were reacted as in Example 1 in the presence of 100 ml of xylene and 2 g of Swedcat 3. 22 ml of condensate was separated. 146 g of pentaerythritol, 336 g of phthalic anhydride and 106 g of poly(ethylene glycol) having an average molecular weight of 3,000 were added to the cooled reaction mixture which was then reheated to 200° C. After the separation of 22 ml of water as condensate and after an acid value of 50 had been reached, the reaction mixture was cooled to 150° C., 124 g of Epicote™ 1001 (a bisphenol-A-based epoxy resin having an average molecular weight of about 900 from Shell, 2.0–2.2 moles of epoxide per kg of resin) were added and the mixture was reheated to 200° C. The reaction was terminated at an acid value of 10 and the xylene was removed in vacuo. The epoxidized alkyd resin was neutralized with 32 g of 2-amino-2-methyl propanol . 2 EO per kg of resin.

Example 6

Laboratory labeling of PET bottles with plastic labels

The alkyd resins produced in accordance with Examples 1 to 5 were used for the laboratory labeling of PET bottles with polystyrene labels. To this end, the alkyd resins heated to 130° C. were applied in two spots to the label using a glass rod, after which the label was pressed onto the bottle. The label was then overlappingly glued with applied alkyd resin. After 12 hours, the labeled bottle was held under running water heated to 70° C. The label separated from the bottle without any mechanical assistance; the adhesive on the bottle had apparently disappeared after 5 minutes.

The invention claimed is:

1. A process for adhesively bonding a first and a second substrate, said process comprising steps of:

(A) applying to the surface of at least one of the first and second substrates a molten layer of a polyester resin hot-melt pressure-sensitive adhesive that is made by an esterification reaction among: at least 15% by weight of materials selected from the group consisting of monobasic carboxylic acids and esters thereof; at least 15% by weight of materials selected from the group consisting of polybasic carboxylic acids and anhydrides thereof; and at least 5% by weight of each of polyhydric alcohols and polyethylene glycol having a molecular weight of from 600 to 6,000, said hot-melt adhesive containing, in its acid form, residual acid carboxyl groups which in the hot-melt adhesive as used are at least partly reacted to form salts; and (B) pressing together the first and second substrates, at least one of which was coated in step (A), so that the coated layer of adhesive is between the first and second substrates, the hot-melt adhesives coated in step (A) being removable with aqueous solutions.

2. The process as claimed in claim 1, said process being used for applying paper and plastic labels on other materials, for page gluing, for pallet stabilization or in paper converting.

3. The process as claimed in claim 1 wherein the hot-melt pressure-sensitive adhesive comprises a urethane or epoxy-modified polyester resin.

4. The process as claimed in claim 1 wherein the polyester resin pressure-sensitive hot-melt adhesive used also contains tackifier resins, plasticizers and stabilizers.

5. A process as claimed in claim 1 wherein the polyester resin hot-melt pressure-sensitive adhesive has been produced by reacting a mixture including polyethylene glycol having an average molecular weight of 2,000 to 4,000 in a quantity of 5 to less than 15% by weight, based on the mixture of reactants.

6. The process as claimed in claim 5, wherein the polyester resin hot-melt pressure-sensitive adhesive has been made by reacting trihydric or higher alcohols or alkylene oxide adducts thereof in in quantities from above 20% to 40% by weight, based on the mixture of reactants.

7. The process as claimed in claim 6, wherein the polyester resin hot-melt pressure-sensitive adhesive has been made by reacting dicarboxylic acids, anhydrides thereof, or mixtures of dicarboxylic acids and anhydrides thereof in quantities of 20 to 35% by weight, expressed as anhydride and based on the mixture of reactants.

8. The process as claimed in claim 7, wherein the alkyd resin hot-melt pressure-sensitive adhesive used has been made by reacting natural fatty acids containing 6 to 22 carbon atoms, triglycerides thereof, or mixtures of natural fatty acids containing 6 to 22 carbon atoms and triglycerides thereof, optionally in conjunction with versatic acids, abietic acid, esters thereof or mixtures of any two or more of versatic acids, abietic acid, and esters thereof, in quantities of 15 to 50% by weight, expressed as acid and based on the mixture of reactants.

9. The process as claimed in claim 8, wherein the natural fatty acids, triglycerides thereof or mixtures of natural fatty acids and triglycerides thereof have an iodine value below 70.

10. The process as claimed in claim 8, wherein the polyester resin hot-melt pressure-sensitive adhesive has been made by reacting synthetic fatty acids containing 7 to 21 carbon atoms, esters thereof, or mixtures of synthetic fatty acids containing 7 to 21 carbon atoms with esters thereof, optionally in conjunction with versatic acids, abietic acid, esters thereof, or mixtures of any two or more of versatic acids, abietic acid, and esters thereof, in quantities of 15 to 50% by weight, expressed as acid and based on the mixture of reactants.

11. The process as claimed in claim 10, wherein the synthetic fatty acids, esters thereof, or mixtures of synthetic fatty acids with esters thereof have an iodine value below 70.

12. The process as claimed claim 11, wherein the polyester resin hot-melt pressure-sensitive adhesive has been made by reacting aromatic carboxylic acids, ring-substituted derivatives thereof, or a mixture of aromatic carboxylic acids and ring-substituted derivatives thereof in quantities of 5 to 25% by weight, based on the mixture of reactants.

13. The process as claimed in claim 1, wherein the polyester resin hot-melt pressure-sensitive adhesive, in its acid form, has a residual acid value of 2 to 100 and at least 10% of the residual acid value has been neutralized with bases in the polyester resin hot-melt pressure-sensitive adhesive as applied.

14. The process as claimed in claim 1, wherein the polyester resin hot-melt pressure-sensitive adhesive has been made by reacting trihydric or higher alcohols or alkylene oxide adducts thereof in quantities of 10 to 40% by weight, based on the mixture of reactants.

15. The process as claimed in claim 1, wherein the polyester resin hot-melt pressure-sensitive adhesive has been made by reacting dicarboxylic acids, anhydrides thereof, or mixtures of dicarboxylic acids and anhydrides thereof in quantities of 15 to 40% by weight, expressed as anhydride and based on the mixture of reactants.

16. The process as claimed in claim 1, wherein the alkyd resin hot-melt pressure-sensitive adhesive has been made by reacting natural fatty acids containing 6 to 22 carbon atoms, triglycerides thereof, or mixtures of natural fatty acids containing 6 to 22 carbon atoms and triglycerides thereof, optionally in conjunction with versatic acids, abietic acid, esters thereof or mixtures of any two or more of versatic acids, abietic acid, and esters thereof, in quantities of 15 to 50% by weight, expressed as acid and based on the mixture of reactants.

17. The process as claimed in claim 1, wherein the polyester resin hot-melt pressure-sensitive adhesive has been made by reacting synthetic fatty acids containing 7 to 21 carbon atoms, esters thereof, or mixtures of synthetic fatty acids containing 7 to 21 carbon atoms with esters thereof, optionally in conjunction with versatic acids, abietic acid, esters thereof, or mixtures of any two or more of versatic acids, abietic acid, and esters thereof, in quantities of 15 to 50% by weight, expressed as acid and based on the mixture of reactants.

18. The process as claimed in claim 1, wherein the polyester resin hot-melt pressure-sensitive adhesive has been made by reacting aromatic carboxylic acids, ring-substituted derivatives thereof, or a mixture of aromatic carboxylic acids and ring-substituted derivatives thereof in quantities of 5 to 25% by weight, based on the mixture of reactants.

19. A process as claimed in claim 1 wherein the polyester resin hot-melt pressure-sensitive adhesive used is removable with water alone.

20. A process as claimed in claim 1 wherein the polyester resin hot-melt pressure-sensitive adhesive contains carboxylate salts of at least one base selected from the group consisting of non-volatile amines and hydroxides of the alkali metals and alkaline earth metals.

* * * * *